United States Patent [19]

Boyle et al.

[11] 3,715,704
[45] Feb. 6, 1973

[54] REVERSIBLE POWER TAKE-OFF SHAFT

[75] Inventors: Ralph C. Boyle, Mountain Home, Ark.; Leonard Paulius, Clarendon Hill, Ill.

[73] Assignee: International Harvester Company, Chicago, Ill.

[22] Filed: Nov. 3, 1971

[21] Appl. No.: 195,292

[52] U.S. Cl. ................................................ 74/15.4
[51] Int. Cl. ............................................ F16h 37/04
[58] Field of Search .............................. 74/11, 15.4

[56] References Cited

UNITED STATES PATENTS

| | | | |
|---|---|---|---|
| 3,002,393 | 10/1961 | Browning | 74/11 |
| 3,059,505 | 10/1962 | Reicks | 74/11 X |
| 3,513,712 | 5/1970 | Zajichek et al. | 74/15.2 |
| 3,561,277 | 2/1971 | Boyle et al. | 74/15.4 |

*Primary Examiner*—Leonard H. Gerin
*Attorney*—Floyd B. Harman

[57] ABSTRACT

A power take-off shaft having two standard spline ends and a third off centrally located spline set. In conjunction with a multi-speed independent power take-off unit, the single shaft is reversible to provide two different output speeds.

8 Claims, 3 Drawing Figures

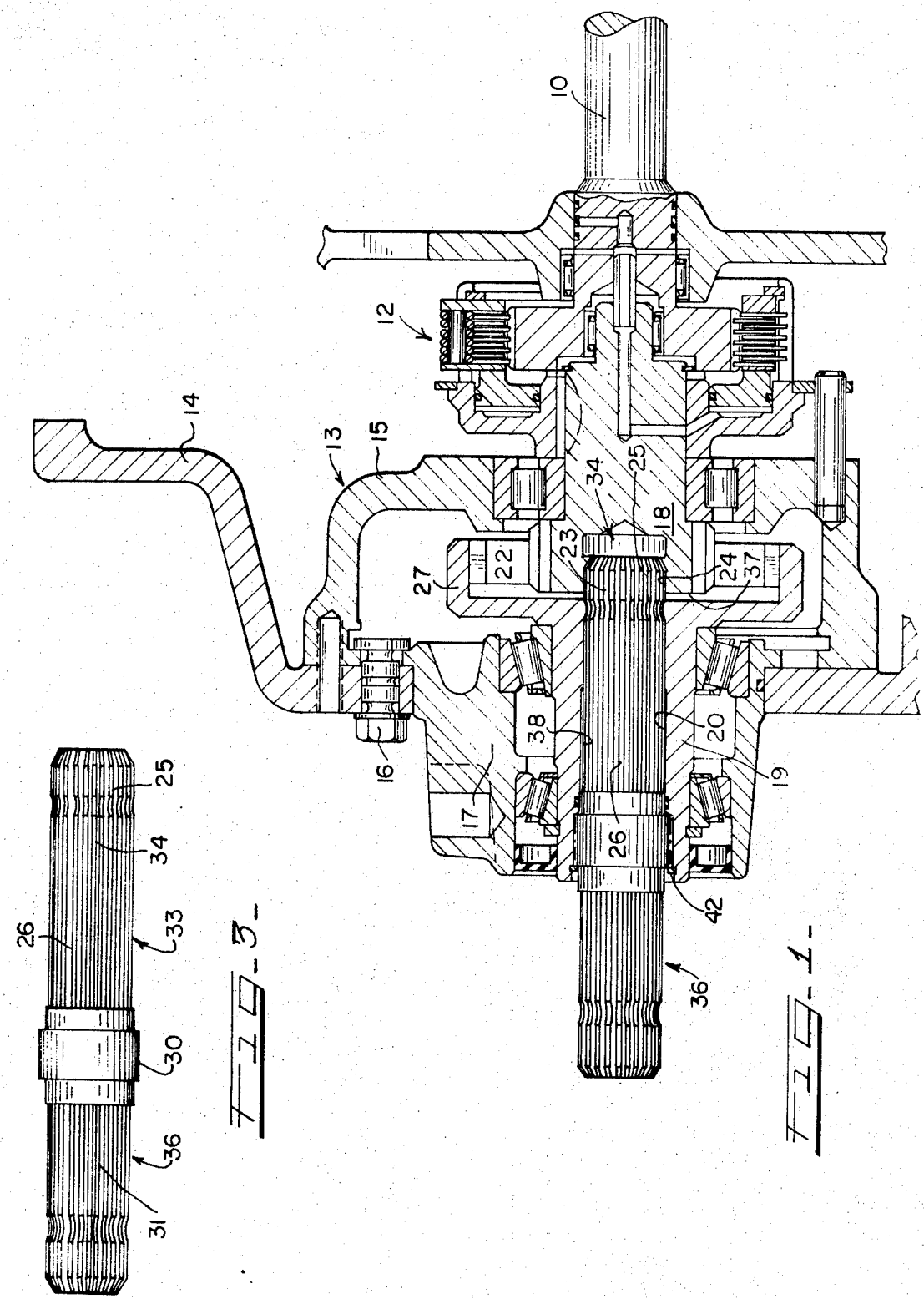

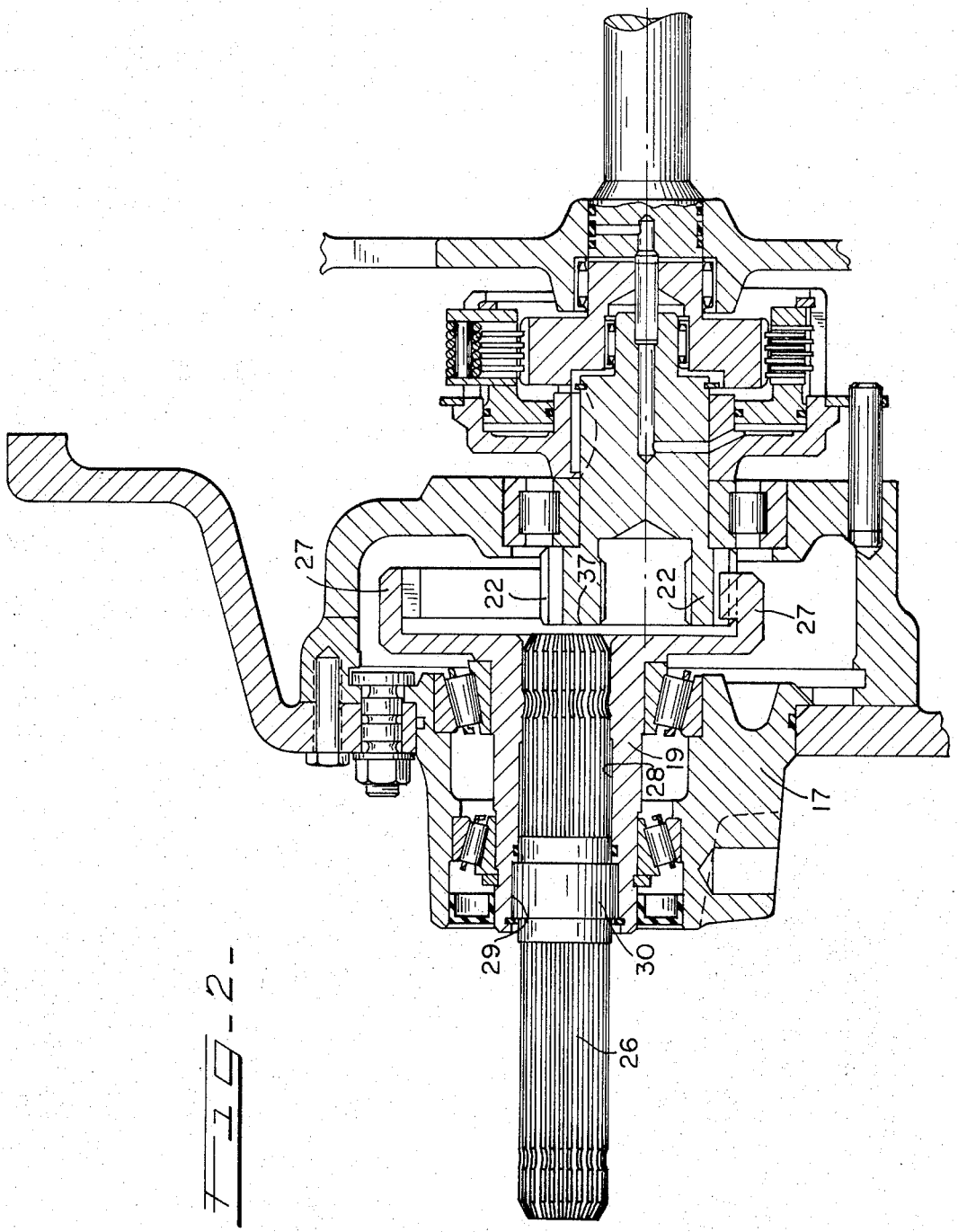

REVERSIBLE POWER TAKE-OFF SHAFT

BACKGROUND OF THE INVENTION

This invention relates to a power take-off shaft which when used in combination with a multi-speed independent power take-off unit, allows two power take-off output speeds to be obtained with a single shaft. More specifically, as disclosed in the preferred embodiment, the instant invention relates to a power take-off shaft, having three different spline sets, which is reversible to provide several different output speeds.

DESCRIPTION OF THE PRIOR ART

The utilization of a power drive shaft by the engine of a farm tractor for the purpose of delivering power to associated implements is quite well known in both the United States and foreign countries. The acceptance of such drive mechanisms has been followed by the acceptance of national standards as to speed and dimensions within the farm industry although, differences may be found between such national standards. For example, within the United States, the industry has adopted as standard a six splined adaptor shaft rotating at speeds of 540 rpm as well as a second standard requiring the use of a 21 splined adapter shaft rotating at 1000 rpm. The 540 rpm speed was the originally adopted standard and the 1000 rpm speed being subsequently adapted. Thus, in order for a farm tractor to be able to utilize PTO driven equipment designed to be operated at 540 rpm as well as PTO driven equipment which is to be powered at 1000 rpm, it is necessary to provide a mechanism for the tractor which will provide a quick and simple conversion. Similarly, in many foreign countries a standard has been accepted which requires that the PTO driven equipment be driven at speeds of 590 rpm and 1000 rpm. Thus, in the design of farm tractors for world-wide sale, it is imperative that a design be made which will allow simple conversion to a combination of any two of these three speeds.

The prior art itself discloses many varied devices for providing at least two speeds for the power take-off shaft. Examples of such prior art would include U.S. Pat. No. 3,513,712 issued to Zajichek, as well as U.S. Pat. No. 3,561,277 issued to Boyle. Although acceptable, such designs may result in excessive manufacturing costs and require an excessive amount of space within the tractor frame. Or as in the case of Boyle, require two power take-off shafts in order to obtain two different output speeds.

It is an object of this invention to provide a single reversible power take-off shaft for alternate connection to either a first output drive, or a second output drive while positioning the proper spline end for coupling to an implement.

It is another object of this invention to provides a reversible power take-off shaft having standard six tooth and 21 tooth spline ends and an off-center located 27 tooth spline portion.

It is yet another object of this invention to provide a drive mechanism which is easily adapted to provide different variations and combinations of speeds for utilization with power take-off driven implements.

SUMMARY OF THE INVENTION

Accordingly, the instant invention relates to a novel and unique reversible PTO shaft particularly adapted for utilization in the power take-off drive mechanism disclosed in U.S. Pat. No. 3,561,277 issued to Boyle. The combination takes the form of a multi-speed independent power take-off unit as described in Boyle, and a single reversible power take-off shaft. The reversible shaft itself has two standard spline ends and a third off-center located spline set, the diameter of said standard spline ends being slightly less than that of the third off-centered spline.

The manner in which these and other objects of the instant invention may be made clear by consideration of the following specification and claims when taken on conjunction with the accompanying drawings.

Preferred embodiments of this invention are illustrated in the attached drawings.

FIG. 1 is a side elevation view taken in section along the center line of the change speed mechanism and power take-off shaft, disclosing said mechanism in a direct drive position;

FIG. 2 is a similar view disclosing the combination in a gear reduction position; and FIG. 3 is a side elevation view of the reversible power take-off shaft.

DETAILED DESCRIPTION

As exemplified in the attached drawings, the preferred embodiment of this unique invention is incorporated into a modified multi-speed independent power take-off unit disclosed in U.S. Pat. No. 3,561,277 issued to Boyle.

With more specific reference to the instant invention, FIG. 1 shows the take-off shaft 26 mounted in the multi-speed unit for delivery of 1000 rpm. The drive is provided from the engine of the vehicle, not shown, at normal operating speed of 1000 rpm, to the IPTO extension shaft 10. Interposed between the IPTO extension shaft 10 and the PTO drive shaft 18 is a hydraulic clutch 12 for selectively delivering or interrupting power therebetween. The housing 13 includes web sections 15 joined to frame 14 by bolts 16 or other conventional means. Within the web section 15 is an annular movable carriage or case 17 whose center is eccentric with respect to countershaft 10 as well as engine PTO drive shaft 18, and as disclosed in FIG. 1, its center lies above the common axis of the aforesaid shafts. This cage means rotatably journals an output shaft or second member 19 having a bore 20 throughout. The output shaft 19 is also eccentric to carriage member 17, the degree of eccentricity being such as to permit axial alignment of bore 20 with drive shaft 18. A spur gear pinion 22 is provided integrally with shaft 18 having external teeth 23 and a first set of internal splines 24 is positioned in counterbore 34 of engine drive shaft 18. These spines 24 are adapted for receiving a first splines set 25 of the reversible power take-off shaft 26 so as to provide direct drive from IPTO extension shaft 10 through the clutch assembly 12, the drive shaft 18 and splines 24 and 25 to the shaft 26, an implement drive shaft being connected to the rearwardly extending portion of a reversible power take-off shaft means 26.

It will be observed in FIG. 2 that if the carriage 17 is rotated 180°, the ring gear 27 will be moved upwardly so as to mesh with spur gear pinion 22 and speed reduction is effectuated since the output shaft member 19 is driven at a reduced speed. A second internal spline set 29 located on wall 28 will now mesh with a second spline set 30 of reversible power take-off shaft 26 for delivery of power to the implement. Thus, a hollow output drive shaft member 19 when eccentrically carried by a rotatable cage 17 provides a two-speed output, if in a first position, the output shaft is aligned with the input member and in a second position is driven by the input member.

The power take-off shaft 26 is comprised of three different spline sets, a first six spline set 25, a second 21 spline set 30 and a third 21 spline set 31. The sections of the shaft as shown in FIGS. 2 and 3 are different in that the shaft section 33 is longer and its splines 25 are wide enough to engage only the internal spline 24 formed in counterbore 34. Shaft section 36 is shorter and its diameter is the same as is shaft end 33, thus neither engaging the walls 38 of the hollow output shaft 19 nor contacting the face 37 of the spur gear pinion. The second internal spline set 29 corresponds with and meshes with second spline set 30. Spline set 30, on the shaft 26 is provided such that when the cage 17 is in the position of FIG. 2, the spline sets 29 and 30 intermesh and power from the output shaft is transferred to reversible take-off shaft 26 at 540 rpm. The spline set 30 has a greater diameter than either of the standard spline sets 25 and 31 and is off-centered towards the third spline set 31 having 21 splines. If the housing 13 is rotated 180° as shown in FIG. 1 and the output shaft 26 reversed, the splines 25 engage only internal splines 24 of the engine drive shaft 18 and thus a speed of 1000 rpm is delivered through the output shaft 26. A snap ring 42 precludes axial outward movement of the shaft when in either position, once having been engaged.

It should be noted that the off-centered feature permits easy touch recognition of the respective spline ends. That is, the operator can indentify the spline ends in the dark for example, simply by determining which end is longer. The off-set second spline set is also a safety factor. This feature is due to the fact that the diameter of spline set 30 is greater than that of bore 20, thus it is not possible to accidentally reverse the shaft 26 and insert spline set 31 into counterbore 34, since spline set 30 would bind with bore 20 prior thereto.

As previously mentioned, direct drive is provided directly from the spur gear pinion 22 when the PTO output shaft 19 and the case member 17 are in the position described in FIG. 1 such that the reversible shaft may extend directly thereto. Such effectuates a gear ratio of 1 to 1 and a 1000 rpm speed is obtained. However, in order to obtain an output speed of 540 rpm, a gear reduction of 18:34 is necessary and consequently, the spur gear pinion 22 is provided with 18 teeth while the ring gear 27 of the PTO output shaft 19 is provided with 34 teeth. In order to provide for another gear reduction, it is only necessary to change a spur gear pinion 22 or ring gear 27. For example, if the manufacturer desires to comply with European standards of 590 rpm, at 20:34, gear reduction is necessary and the pinion should be provided with 20 teeth. In operation, the device will be identical to that previously described, since the pitch diameter of pinion having 20 teeth will have a greater dimension, engagement with the internal ring gear 27 having 34 teeth will be effectuated upon a lesser rotation of carriage member 17.

In summary, it should be clear that applicants have provided a unique and inexpensive method of power take-off assembly by providing for a reversible power take-off shaft. With respect to the desired gear ratios defined by the standards both here and abroad, the favorable advantages achieved is that a single take-off shaft without any modification of the take-off assembly is provided which will deliver two different gear speeds. Finally, by the simple substitution of a spur gear pinion, the PTO mechanism is readily adaptable for compliance with standards in various other countries.

The embodiment of the invention in which an exclusive property of privilege is claimed is defined as follows:

What is claimed is:

1. A power take-off assembly for a tractor being pivotable to provide a multiplicity of output speeds in conjunction with a single power take-off shaft comprising:
   a multi-speed independent power take-off unit having a movable cage carried by said tractor, said cage having an eccentric means therein, said means having a bore with first and second internal spline sets; and
   a reversible power take-off shaft having a first, second and third spline sets, said second spline set being positioned to one side between said first and third set and having a diameter greater than that of said first and third set.

2. The power take-off assembly of claim 1 wherein said first spline set of said shaft meshes with said first internal spline set of said bore and said second spline set of said shaft meshes with said second internal spline set.

3. The power take-off assembly of claim 1 wherein said power take-off shaft is a cylindrical shaft.

4. The power take-off assembly of claim 1 wherein said first spline set has six teeth, said second spline set has 27 teeth and said third spline set has 21 teeth.

5. The power take-off assembly of claim 1 wherein said second spline set is off centered toward said third spline set.

6. A movable cage power take-off assembly fixed to the frame of a tractor, means eccentrically carried by said cage and having a bore means therein said bore means having first and second internal spline sets; and wherein the improvement comprises a reversible cylindrical power take-off shaft having a first, second and third spline set, said second spline set being positioned to one side of said shafts center between said first and third set and having a diameter slightly greater than said first and third spline sets.

7. The reversible cylindrical power take-off shaft of claim 6 wherein said first spline set has six teeth, said second spline set has 27 teeth and said third spline set has 21 teeth, said second spline set being off centered toward said third spline set.

8. The reversible cylindrical power take-off shaft of claim 6 wherein said first spline set meshes with said first internal spline set of said bore and said second spline set meshes with said second internal spline set of said bore.

* * * * *